H. WIARD & A. J. SPIRE.
REVERSIBLE PLOW.
APPLICATION FILED JUNE 6, 1910.
1,126,603.
Patented Jan. 26, 1915.
2 SHEETS—SHEET 1.
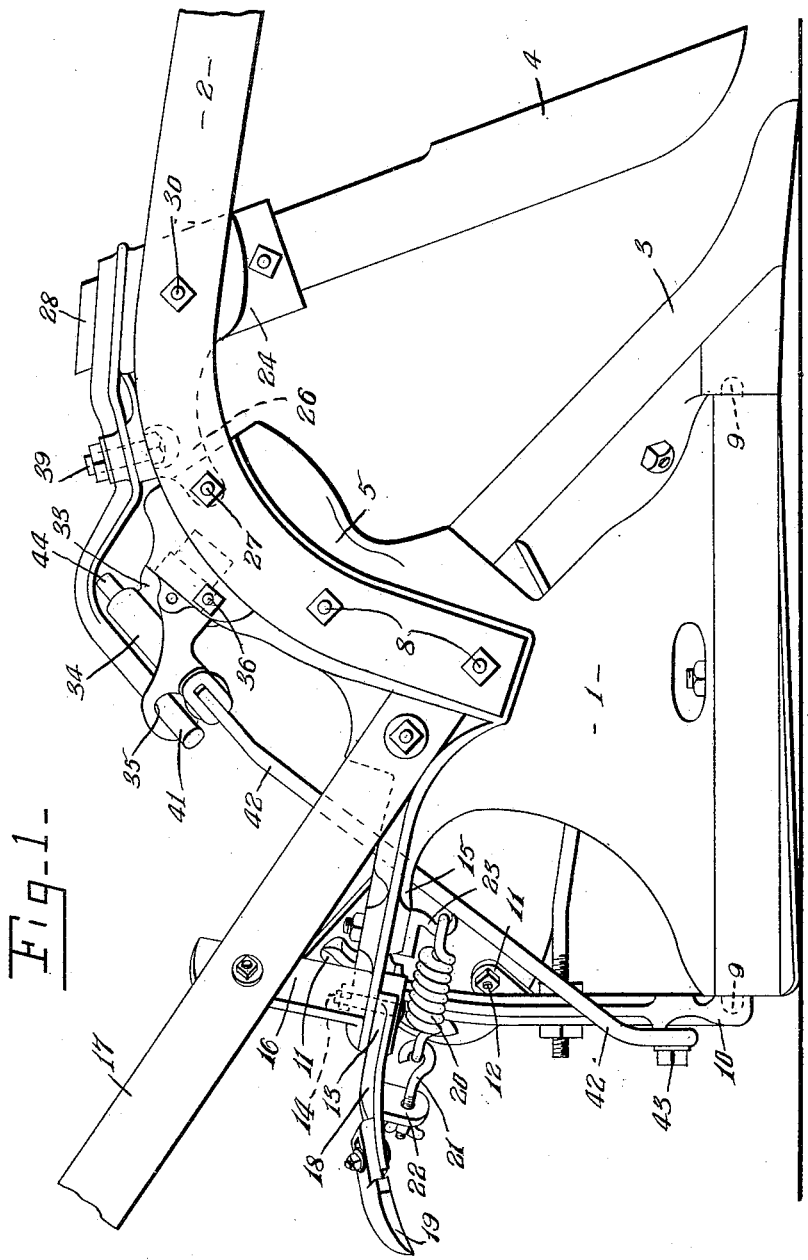
WITNESSES:
Chas H. Young.
S. Davis.
INVENTORS
Harry Wiard
Alvin J. Spire
BY
Parsons, Hall & Porter
ATTORNEYS

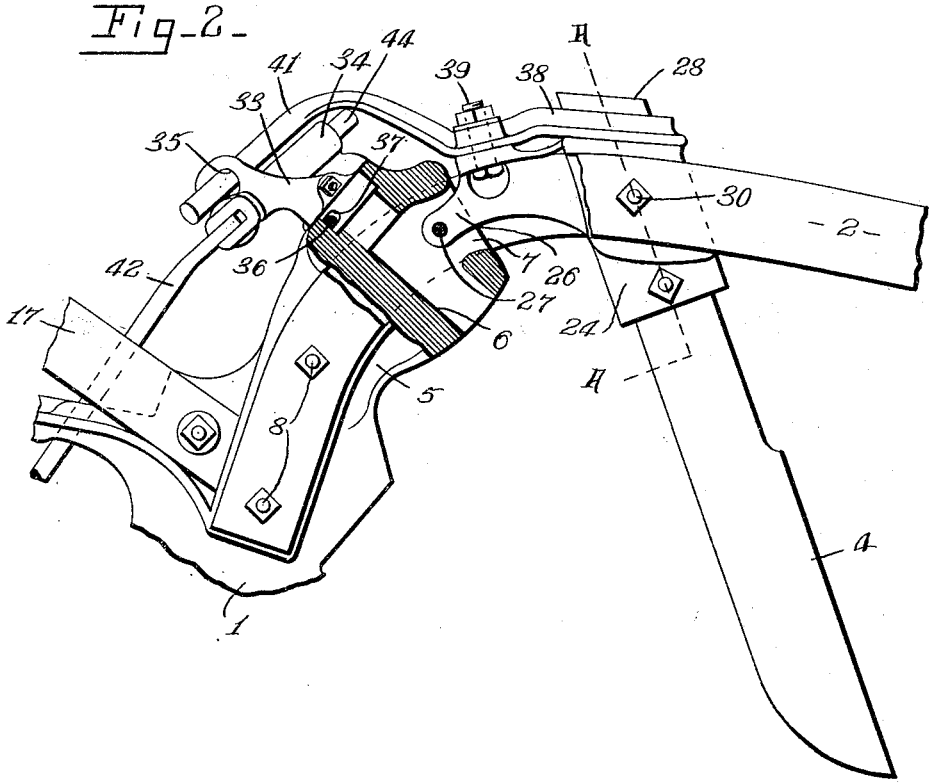
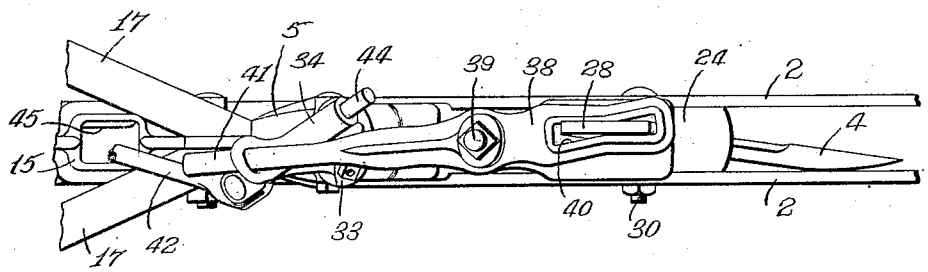
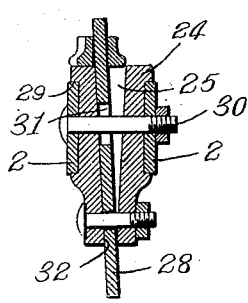

UNITED STATES PATENT OFFICE.

HARRY WIARD AND ALVIN J. SPIRE, OF SYRACUSE, NEW YORK, ASSIGNORS TO SYRACUSE CHILLED PLOW COMPANY, OF SYRACUSE, NEW YORK, A CORPORATION OF NEW YORK.

REVERSIBLE PLOW.

1,126,603.    Specification of Letters Patent.    Patented Jan. 26, 1915.

Application filed June 6, 1910. Serial No. 565,190.

*To all whom it may concern:*

Be it known that we, HARRY WIARD and ALVIN J. SPIRE, of Syracuse, in the county of Onondaga and State of New York, have invented a certain new and useful Reversible Plow, of which the following is a specification.

Our invention relates to reversible plows and particularly to means for reversing the turf cutters thereof; and it consists in the combinations and constructions hereinafter set forth and claimed.

In describing this invention reference is had to the accompanying drawing in which like characters designate corresponding parts in all the views.

Figure 1 is a side elevation, partly broken away, of a plow embodying our invention. Fig. 2 is a fragmentary view, partly in section, of parts seen in Fig. 1. Fig. 3 is a plan of parts seen in Fig. 2. Fig. 4 is a sectional view on line "A—A" Fig. 2.

1 is the standard; 2 is the beam; 3 the earth-turning element, and 4 the turf cutter of the plow.

The standard 1 is formed with an upwardly and forwardly extending arm 5 formed with an upwardly and rearwardly inclined bearing 6 opening through its rear face and with a socket 7 opening through its upper end face.

The beam 2 usually comprises opposing sections having their rear ends spaced apart and fixed as by bolts 8 to opposite sides of the arm 5 of the standard 1.

The earth-turning element 3 is shiftable from either side of the standard to the other into position to turn right or left furrows and is here illustrated as pivotally mounted on trunnions 9 extending forwardly and rearwardly from the standard 1 near the bottom thereof, a rock arm 10 being pivoted on the rear trunnion 9 and extending upwardly therefrom and connected to the rear end of the mold board in a well-known manner.

The earth-turning element is held in either of its operative or plowing positions by suitable means as a shiftable member 13 secured by a vertical pivot 14 to a rearwardly extending arm 15 of the standard, this pivot extending through the bail portion of a U-shaped brace 16, the branches of which are extended upwardly and secured to the handles 17 of the plow as seen in Fig. 1 in which one handle 17 and the contiguous portion of the bracket 16 is shown, the other handle 17 and the other branch of the bracket 16 being duplicates of those shown and being concealed by said parts 17 and 16 respectively. The shiftable member 13 comprises radial arms as the arm 19, said arms being provided at their ends with adjustable hooks as 19 for engaging the branches 11 of the arm 10 when the earth-turning element is in either its operative or plowing positions. The member 13 is held in either of its operative positions by a spring 20 connected at one end to a link 21 which is secured to a lug 22 depending from the member 13 and at its other end to a hook-shaped part 23 associated with the standard 1.

When it is desired to shift the earth-turning element 3, the standard 1 is raised off the ground by lifting the handles 17 and the member 13 moved by the hand or foot on its pivot sufficiently to carry one hook 19 out of engagement with the contiguous branch 11. The member 13 thereupon is moved by the spring 20 an additional distance to arrange the other hook 19 in operative position, and meanwhile the element 3 swings about its axis under the standard and engages the other branch 11 with the other hook 19.

The member 13 and the parts with which it coacts form no part of our present invention and for full description thereof reference is had to our pending application filed May 2, 1910, Sr. No. 558,764.

24 is a bracket arranged between the sections of the beam 2 in front of the arm 5, said bracket being formed with a downwardly inclined opening or passage 25 and with a rearwardly extending arm 26 extending into the socket 7 at the front end of the arm 5 and being secured in said socket by a transversely extending bolt 27.

The turf cutter 4 is usually of the colter type and comprises a blade or main portion and a shank 28 extending upwardly through the passage 25 and projecting above the bracket 24. Said bracket is formed with shoulders 29 for engaging the upper and lower edges of the beam and it is additionally secured in position by a bolt 30 extending transversely through the sections of the beam and through the bracket, and through a slot 31 in the shank 28 of the colter. The shank 28 is shiftable laterally about an axis in the passage 25 during the reversing movement of the turf cutter, the passage 25 being wider at its upper end than at its lower end and the shank fulcruming at 32 on the walls of the passage 25 at the lower end of the bracket. This reversing movement is effected by connections between the earth-turning element and the colter whereby the colter is shifted laterally during the reversing of the earth-turning element. These connections include an actuating member 33 journaled in the bearing 6 of the arm 5 of the standard, power-transmitting connections between said member and the colter and between the earth-turning element and the journaled member 33.

As here shown the member 33 is provided with two passages, one being mounted above the other and one of such passages being formed by an elongated sleeve 34 arranged with its axis obliquely relatively to the vertical plane of the beam and the other passage consisting of an eye 35 mounted on the sleeve and arranged less obliquely relatively to said plane.

The member 33 is held in its bearing by a transversely extending key 36 lying partly in a peripheral slot or groove 37 in the member 33. The connections between said member and the turf cutter comprise a lever 38 pivoted at 39 between its ends to the bracket 24 or the arm 26 thereof and being provided at its front end with a slot 40 for receiving the projecting portion of the shank 28. The rear arm 41 of the lever 36 curves upwardly over the actuating member 33 and the sleeve 34, and extends into and slidably engages the eye 35.

The connections between the earth-turning element and the member 33 comprise a link 42 pivoted at its lower end at 43 to the rock arm 10 and at its upper end to the rod 44 slidable in the sleeve 34, the link 42 extending through an opening 45 in the rearwardly extending arm 15 of the standard and fulcruming on opposite walls thereof during the reversing movement of the earth-turning element. Obviously as the earth-turning element swings from one side of the standard to the other, the member 33 will oscillate in its bearing rocking the lever 38 and thereby shifting the turf cutter.

What we claim is—

1. In a reversible plow, a standard, a beam fixed to the standard, an earth-turning element shiftable from either side of the standard to the other into position to turn right or left furrows, a bracket supported by the beam and separable therefrom, a reversible turf cutter supported by the bracket and shiftable relatively thereto during the reversing movement of the turf cutter, and means for reversing the turf cutter including a lever pivoted to the bracket and engaging said turf cutter, substantially as and for the purpose described.

2. In a reversible plow, a standard, a beam comprising opposing sections having their rear ends spaced apart and secured to the opposite sides of the standard, an earth-turning element shiftable from either side of the standard to the other into position to turn right or left furrows, a bracket supported by the beam between the sections thereof and in front of the standard, the bracket being separable from the beam and having a downwardly extending passage, a reversible turf cutter having a shank extending through the passage of the bracket and projecting above the bracket, the turf cutter being shiftable laterally in the passage relatively to the bracket during the reversing movement of the turf cutter, and means for reversing the turf cutter including a lever pivoted between its ends to the bracket and having a slot at its front end for engaging the projecting portion of the shank, and actuating means engaging the rear end of the lever, substantially as and for the purpose specified.

3. In a reversible plow, a standard, a beam comprising opposing sections having their rear ends spaced apart and secured to the opposite sides of the standard, an earth-turning element shiftable from either side of the standard to the other into position to turn right or left furrows, a bracket supported by the beam between the sections thereof, the bracket being separable from the beam and having a downwardly extending passage and a rearwardly extending arm secured to the standard, a reversible turf cutter having a shank extending through the passage of the bracket and projecting above the bracket, the turf cutter being shiftable laterally in the passage relatively to the bracket during the reversing movement of the turf cutter, and means for reversing the turf cutter including a lever pivoted between its ends to the bracket and having a slot at its front end for receiving the projecting portion of the shank, and means coacting with the rear end of the lever, substantially as and for the purpose set forth.

4. In a reversible plow, a standard formed with an upwardly and forwardly extending arm, the arm having a recess in the front end thereof, a beam comprising opposing sections having their rear ends spaced apart and secured to the opposite sides of the arm of the standard, an earth-turning element shiftable from either side of the standard to the other into position to turn right or left furrows, a bracket supported by the beam between the sections thereof in front of the end of the arm of the standard and having a downwardly extending passage and a rearwardly extending arm projecting into said socket of the arm of the standard and being secured therein, the bracket thereby being separable from the beam, a reversible turf cutter having a shank extending through the passage of the bracket and projecting above the bracket, the turf cutter being shiftable in the opening relatively to the bracket during the reversing movement of the turf cutter, and means for reversing the turf cutter including a lever pivoted between its ends to the bracket and having a slot at its front end for receiving the projecting portion of the shank, and actuating means for coacting with the rear end of the lever, substantially as and for the purpose described.

5. In a reversible plow, a standard formed with a bearing near its front end, a beam fixed to the standard, an earth-turning element shiftable from either side of the standard to the other into position to turn right or left furrows, a bracket supported by the beam in front of the standard and being separable from the beam, a reversible turf cutter supported by the bracket and shiftable relatively thereto during the reversing movement of the turf cutter, means for reversing the turf cutter including a member journaled in the bearing of the standard, connections between said member and the turf cutter and connections between said member and the earth-turning element, substantially as and for the purpose specified.

6. In a reversible plow, a standard formed with a bearing, a beam fixed to the standard, an earth-turning element shiftable from either side of the standard to the other into position to turn right or left furrows, a bracket supported by the beam, the bracket being separable from the beam, a reversible turf cutter supported by the bracket and shiftable relatively thereto during the reversing movement of the turf cutter, means for reversing the turf cutter including a member journaled in the bearing of the standard, a lever pivoted between its ends and coacting at its front end with the turf cutter and at its rear end with the journaled member, and connections between the journaled member and the earth-turning element, substantially as and for the purpose set forth.

7. In a reversible plow, a standard formed with a bearing, a beam fixed to the standard, an earth-turning element shiftable from either side of the standard to the other into position to turn right or left furrows, a bracket supported by the beam and separable therefrom, a reversible turf cutter supported by the bracket and shiftable relatively thereto during the reversing movement of the turf cutter, and means for reversing the turf cutter including a member journaled in the bearing of the standard, connections between the journaled member and the turf cutter and connections between the earth-turning element and the journaled member, both of said connections being pivotally and slidably connected to the journaled member, substantially as and for the purpose described.

8. In a reversible plow, a standard formed with a bearing, a beam fixed to the standard, an earth-turning element shiftable from either side of the standard to the other into position to turn right or left furrows, a bracket supported by the beam, a reversible turf cutter supported by the bracket and shiftable relatively thereto during the reversing movement of the turf cutter, and means for reversing the turf cutter including a member journaled in the bearing of the standard and provided with two passages arranged with their axes at different oblique angles to the vertical plane of the beam, a pivoted lever having means coacting with the turf cutter, the rear end of the lever extending through one of the passages of the journaled member and connections between the earth-turning element and the journaled member including means slidable in the other of the passages, substantially as and for the purpose specified.

9. In a reversible plow, a standard formed with a bearing, a beam fixed to the standard, an earth-turning element shiftable from either side of the standard to the other into position to turn right or left furrows, a bracket supported by the beam, a reversible turf cutter supported by the bracket and shiftable relatively thereto during the reversing movement of the turf cutter, means for reversing the turf cutter including a member journaled in the bearing of the standard and provided with two passages arranged with their axes at different oblique angles to the vertical plane of the beam, one passage comprising a sleeve and the other an eye mounted on the sleeve, a pivoted lever having means coacting with the turf cutter, the rear end of the lever extending through said eye and slidable therein, connections between the earth-turning element and the journaled member including a rod extending into the sleeve and slidable therein, substantially as and for the purpose set forth.

10. In a reversible plow, a standard formed with an upwardly and forwardly extending arm, the arm being formed with a bearing opening through its rear face, a beam comprising opposing sections having their rear ends spaced apart and secured to the opposite sides of the standard, an earth-turning element shiftable from either side of the standard to the other into position to turn right or left furrows, a bracket supported by the beam between the sections thereof and in front of said arm and having a downwardly extending passage and a rearwardly extending arm secured to said arm of the standard, a reversible turf cutter having a shank extending through the passage of the bracket and projecting above the bracket, the turf cutter being shiftable in the passage relatively to the bracket during the reversing movement of the turf cutter, a member journaled in the bearing of the arm of the standard and provided with two passages arranged with their axes at different oblique angles to the vertical plane of the beam, a lever pivoted between its ends to the bracket and having a slot at its front end for receiving the projecting end of the shank, the rear arm of the lever extending through one of the passages of the journaled member, and connections between the earth-turning element and the journaled member including means slidable in the other of such passages, substantially as and for the purpose described.

11. The combination with a plow having a standard, a beam and a reversible earth turning element, a member journaled in the standard, a connecting mechanism for rocking such member as the earth turning element is reversed, a bracket detachably connected to the plow beam, and a colter having a member extending through the bracket and supported therein to have a rocking movement, a lever pivotally mounted on the bracket, such lever having at one end a slot through which the upper end of the colter extends and having its other end pivotally and slidably connected to said member and detachable therefrom by the endwise movement, substantially as and for the purpose set forth.

In testimony whereof, we have hereunto signed our names in the presence of two attesting witnesses, at Syracuse, in the county of Onondaga, in the State of New York, this 2nd day of June, 1910.

HARRY WIARD.
ALVIN J. SPIRE.

Witnesses:
S. S. SPIRE,
JAMES MANNING,

Copies of this patent may be obtained for five cents each, by addressing the "Commissioner of Patents, Washington, D. C."